(12) United States Patent
Ichikawa

(10) Patent No.: US 8,229,594 B2
(45) Date of Patent: Jul. 24, 2012

(54) AUTOMATIC FINISHING MACHINE AND CONTROL METHOD THEREOF

(75) Inventor: Yoshihiro Ichikawa, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 396 days.

(21) Appl. No.: 12/461,538

(22) Filed: Aug. 14, 2009

(65) Prior Publication Data

US 2010/0057257 A1 Mar. 4, 2010

(30) Foreign Application Priority Data

Aug. 27, 2008 (JP) .................................. 2008-217590

(51) Int. Cl.
G05B 19/18 (2006.01)

(52) U.S. Cl. ......... 700/250; 700/245; 700/253; 700/264

(58) Field of Classification Search ........................ None
See application file for complete search history.

(56) References Cited

U.S. PATENT DOCUMENTS

| | | | | |
|---|---|---|---|---|
| 4,761,745 | A * | 8/1988 | Kodaira ........................ | 700/254 |
| 4,972,347 | A * | 11/1990 | Tarvin et al. .................. | 700/186 |
| 6,670,954 | B2 * | 12/2003 | Arai et al. ..................... | 345/420 |
| 7,613,545 | B2 * | 11/2009 | Watanabe et al. ............ | 700/245 |
| 2003/0198551 | A1 * | 10/2003 | Schmidt et al. ............ | 414/749.1 |
| 2004/0172168 | A1 * | 9/2004 | Watanabe et al. ............ | 700/264 |
| 2004/0199288 | A1 * | 10/2004 | Watanabe et al. ............ | 700/245 |
| 2004/0251866 | A1 | 12/2004 | Gan et al. | |
| 2007/0021868 | A1 * | 1/2007 | Nagatsuka et al. .......... | 700/245 |
| 2008/0004750 | A1 * | 1/2008 | Ban et al. ..................... | 700/245 |
| 2008/0009972 | A1 * | 1/2008 | Nihei et al. ................... | 700/245 |

FOREIGN PATENT DOCUMENTS

| | | |
|---|---|---|
| EP | 0 470 257 A1 | 2/1992 |
| EP | 0 737 903 A2 | 10/1996 |
| FR | 2 577 456 A1 | 8/1986 |
| JP | A-06-285762 | 10/1994 |
| JP | A-08-243910 | 9/1996 |
| JP | A-2004-322242 | 11/2004 |
| JP | A-2006-058961 | 3/2006 |
| WO | WO 2004/071717 A1 | 8/2004 |
| WO | WO 2005/075157 A1 | 8/2005 |

OTHER PUBLICATIONS

European Search Report issued on Dec. 23, 2009 in European Application No. 09168102.3.

* cited by examiner

*Primary Examiner* — Khoi Tran
*Assistant Examiner* — Bhavesh V Amin
(74) *Attorney, Agent, or Firm* — Oliff & Berridge, PLC

(57) ABSTRACT

This method controls an automatic finishing machine using a robot with a tool through a model storage step, a data acquisition step, a calculation step, an error derivation step, a correction step and a machining step. In the model storage step, shape data of an unfinished work or data of a three-dimensional model is stored in a memory. In the data acquisition step, the tool is brought into contact with the unfinished work W, thereby obtaining measurement data. Then, in the calculation step, actual-position data on a comparative object point is calculated based on the measurement data. Subsequently, in the error derivation step, a data difference between the calculated actual-position data and position data on the comparative object point in the three-dimensional model is obtained. Thereafter, in the correction step, teaching data indicative of the position of the tool corresponding to the shape data of the three-dimensional model is corrected, based on the data difference. Finally, in the machining step, the finishing process is performed, while the robot (11) is controlled, based on the corrected teaching data.

5 Claims, 6 Drawing Sheets

AUTOMATIC FINISHING MACHINE AND CONTROL METHOD THEREOF

CROSS REFERENCE TO RELATED APPLICATIONS

This application is based upon the prior Japanese Patent Application No. 2008-217590 filed on Aug. 27, 2008, the entire contents of which are incorporated herein by reference.

TECHNICAL FIELD

The present invention relates to an automatic finishing machine adapted for providing a finishing process to a work by using a robot having a tool, and also relates to a method for controlling this machine.

BACKGROUND ART

In a procedure for manufacturing a product, a speed of a machining process, such as turning or lathe turning, has been markedly increased, with recent development of machines used for the process. As compared with the development of the machines related to such process, a finishing process has not been so mechanized, and is still mostly depending on manual labor. As an example of automation currently implemented for such a finishing process, it is known that the automatic finishing machine employing an industrial robot is used partly in the finishing process for a certain part of an airplane. Namely, this automatic finishing machine is configured to provide the finishing process to the work by using the robot having a tool.

As one technique for performing the finishing process, Patent Document 1 listed below teaches one method related to the finishing machine, while Patent Document 2 listed below proposes another method related to a process for removing a burr from the product or the like. Further, as the technique for finishing the product by using the robot, one method for machining the product while controlling the force applied by the robot has been known (Patent Document 3 listed below), and another method for teaching the robot about an arbitrary curved face has been proposed (Patent Document 4 listed below).

Patent Document 1: JP2006-058961A
Patent Document 2: JP2004-322242A
Patent Document 3: JP8-243910A
Patent Document 4: JP6-285762A However, in the techniques for finishing the product by using the automatic finishing machine as described above, if the method for teaching the robot about a desired operation thereof is manually performed, an operator for the finishing machine is required to have considerably high skill. In addition, in the case of such a manual-based method, the operator should teach the robot while repeating try and error, thus requiring unduly much time. Therefore, the production line should be stopped for a long period of time, leading to substantial deterioration of production efficiency. Thus, currently, the method for finishing the product by using such an automatic finishing machine can be applied only to a simple part or region of the work, to which the tool of the machine is readily accessible. Furthermore, this manual-based method for teaching the robot can be performed only in a range in which the robot can be controlled with eyes, thus making it difficult to render such a finishing process highly accurate.

For instance, with an NC lathing machine, an automatic machining process can be carried out, by only preparing an NC tape in an office or the like and then checking the operation of this machine on a production site. Similarly, a technique for applying such an off-line teaching system to the automatic finishing machine has been developed. In other words, it has been attempted to prepare theoretical and optimum teaching data indicative of each desired position of the tool, in advance, on a personal computer (which will be referred to as "PC" below), in order to eliminate a need for special skill or technique for the teaching operation. Further, it has been studied to reduce the time required for teaching the robot on the production site as well as to extend a range to which the automation can be applied.

Although accurate three-dimensional teaching data can be obtained in advance by using the off-line teaching system as described above, a positional deviation tends to occur in an actual environment for machining the work or the like, relative to an ideal environment prepared on the off-line teaching system. Therefore, with adequate correction for such a positional deviation, a significantly accurate finishing process can be securely performed.

SUMMARY OF THE INVENTION

Therefore, it is an object of the present invention to provide a new automatic finishing machine and a method of controlling this machine, which can reduce the time required for teaching the robot on the production site and eliminate the need for special skill or technique for the teaching operation, and which can perform a highly accurate and stable automatic finishing process.

In order to achieve the above object, the present invention provides a method of controlling an automatic finishing machine adapted for providing a finishing process to a work by using a robot provided with a tool, comprising:

a model storage step of storing a shape data of a three-dimensional model for expressing a shape of a work to be unfinished, or storing a teaching data indicative of a position of the tool corresponding to the shape data;

a data acquisition step of bringing the tool into contact with a given portion of the work so as to obtain a measurement data indicative of a contact position between the tool and the work;

a calculation step of calculating, based on the measurement data, an actual-position data indicative of a position of a comparative object point;

an error derivation step of obtaining a data difference between the actual-position data of the comparative object point and a model-position data indicative of a position of the comparative object point in the three-dimensional model;

a correction step of correcting, based on the data difference, the teaching data indicative of the position of the tool corresponding to the shape data of the three-dimensional model so as to obtain a corrected teaching data; and a machining step of performing the finishing process while controlling the robot based on the corrected teaching data.

In the model storage step of the method according to this invention, the shape data or teaching data, on the three-dimensional model of the unfinished work under an ideal environment, is stored, in advance, in a memory of a controller of the robot, from, for example, a PC. Then, the finishing process for the work is automatically performed, while correcting a positional deviation between an actual environment and the ideal environment on such an off-line teaching system. Therefore, the time required for teaching the robot on the production site can be significantly reduced, as well as the need for special skill or technique for the teaching operation can be substantially eliminated. Besides, this method can achieve a highly accurate and stable automatic finishing process.

In this invention, it is preferred that the given portion of the work in the data acquisition step includes three faces crossing each other. With such configuration, a position including the three crossed faces can be selected as the aforementioned predetermined position in which the tool is contacted with the work. For instance, an intersection point of the three faces can be measured, accurately, as the comparative object point of the three-dimensional model.

In this invention, it is preferred that, in the data acquisition step, the measurement data is prepared, based on a posture of the tool and a distal end position of the tool, by obtaining a contact point between the tool and a surface of the work. In this way, the measurement data of the contact point between the tool and the surface of the work can be obtained, with higher accuracy.

Moreover, in order to achieve the above object, the present invention provides an automatic finishing machine adapted for providing a finishing process to a work by using a robot provided with a tool, comprising:

a memory configured to store therein a shape data of a three-dimensional model for expressing a shape of a work to be unfinished, or storing therein a teaching data indicative of a position of the tool corresponding to the shape data;

a data acquisition unit configured to bring the tool into contact with a given portion of the work so as to obtain a measurement data indicative of a contact position between the tool and the work;

a calculation unit configured to calculate, based on the measurement data, an actual-position data indicative of a position of a comparative object point;

an error derivation unit configured to obtain a data difference between the actual-position data of the comparative object point and a model-position data indicative of a position of the comparative object point in the three-dimensional model;

a correction unit configured to correct, based on the data difference, the teaching data indicative of the position of the tool corresponding to the shape data of the three-dimensional model so as to obtain a corrected teaching data; and a machining control configured to perform a finishing process while controlling the robot based on the corrected teaching data.

Similar to the above control method of this invention, this automatic finishing machine can significantly reduce the time required for teaching the robot on the production site, as well as can substantially eliminate the need for special skill or technique for the teaching operation. Additionally, this machine can perform the highly accurate and stable automatic finishing process.

Thus, according to the automatic finishing machine and method of controlling this machine, the shape data or teaching data, on the three-dimensional model of the unfinished work under the ideal environment, can be stored, in advance, in the memory of the controller of the robot, from, for example, the PC, in the model storage step. Then, the finishing process for the work can be automatically performed, while correcting the positional deviation between the actual environment and the ideal environment on the off-line teaching system. Therefore, the time required for teaching the robot on the production site can be securely reduced, as well as the need for special skill or technique for the teaching operation can be substantially eliminated. Furthermore, this machine and method can provide the highly accurate and stable automatic finishing process.

BRIEF DESCRIPTION OF DRAWINGS

The above and other objects, features and advantages of the present invention will become more apparent from the following description taken in connection with the accompanying drawings, in which.

DESCRIPTION OF EMBODIMENTS

Figure 1:
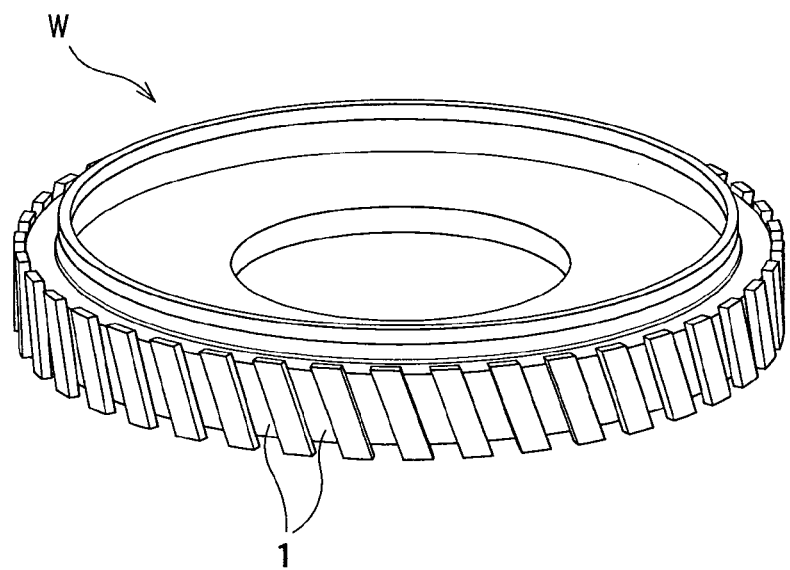
FIG. 1 is a perspective view of a work, to which a finishing process is provided by an automatic finishing machine according to one embodiment of the present invention.
Figures 2A, 2B:
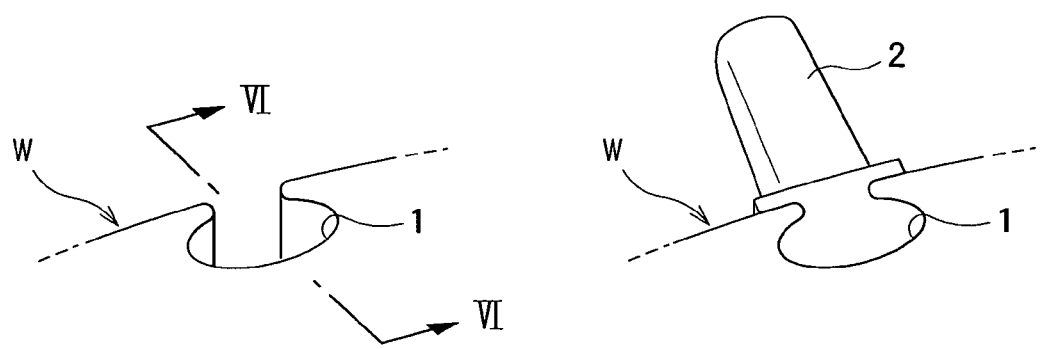
FIG. 2A is a perspective view of a groove formed in the work shown in FIG. 1.
FIG. 2B is a perspective view showing a state in which a blade is fitted in the groove.

Hereinafter, one preferred embodiment of the present invention will be described with reference to the drawings. As shown in FIG. 1, the work W, to which the finishing process is provided, is a disk-like part constituting a compressor of a jet engine. This work W has a plurality of attachment grooves 1 formed in an outer circumference thereof. Each of the grooves 1 is configured to be engaged with a blade 2 (see FIG. 2), and is provided to the work W in an outer-circumferential direction at an equal interval. In this embodiment, the finishing process using the automatic finishing machine is performed to chamfer each attachment groove 1 or the like after the disk-like work W is machined. FIG. 2A is an enlarged schematic and perspective view of one of the grooves 1 formed in the work W shown in FIG. 1, and FIG. 2B is a perspective view showing a state, in which the blade is fitted in the groove 1 of the work W after the work W is machined.

Figures 3A, 3B:
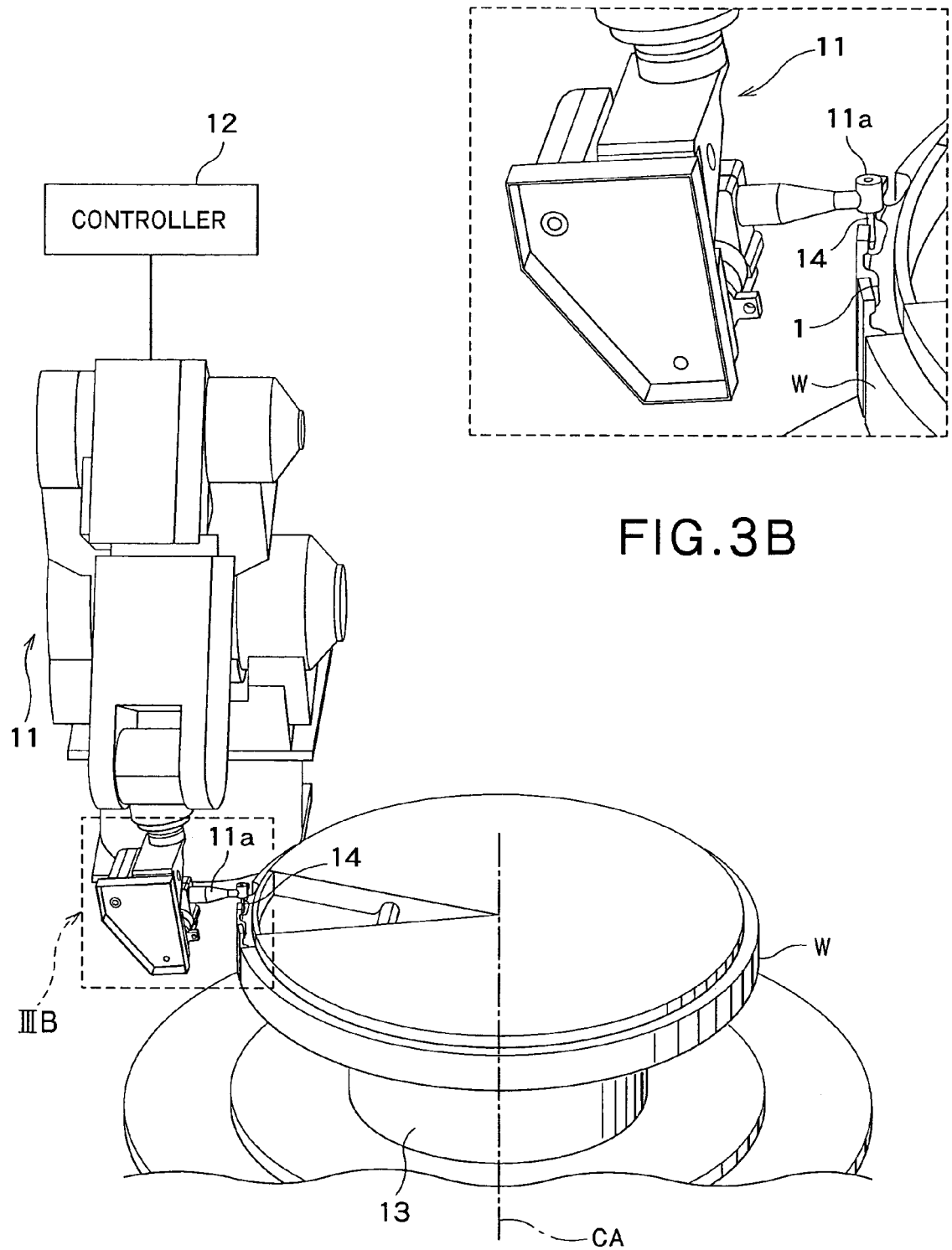
FIG. 3A is a perspective view showing the automatic finishing machine according to the embodiment of the present invention.
FIG. 3B is an enlarged view of a part IIIB of FIG. 3A.

Referring to FIGS. 3A and 3B, the automatic finishing machine includes an articulated robot 11, a controller 12 provided for controlling the robot 11, and a circular table 13 for placing the work W thereon in a concentric position. The robot 11 has a tool 14 configured for providing the finishing process to each attachment groove 1 of the work W. The tool 14 is a blade-like member usually having a truncated-cone-like shape suitable for chamfering an edge or ridge portion of each groove 1 of the work W. While the attachment grooves 1 are provided over the whole circumference of the work W, FIGS. 3A and 3B show only a part of the grooves 1, respectively.

Figure 4:
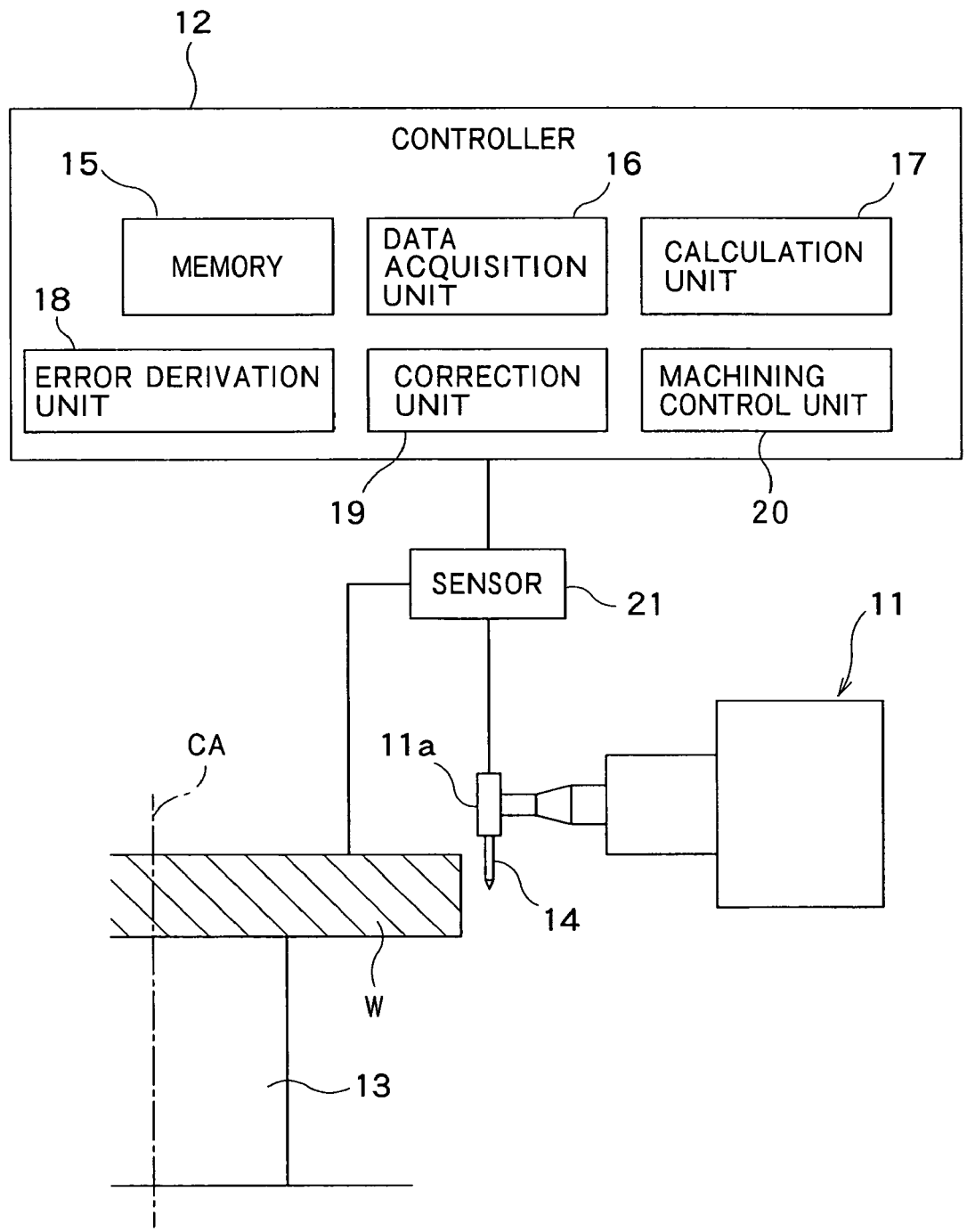
FIG. 4 is a block diagram showing general construction of the automatic finishing machine.

As shown in FIG. 4, the controller 12 includes a memory 15, a data acquisition unit 16, a calculation unit 17, an error derivation unit 18, a correction unit 19 and a machining control unit 20.

The memory 15 is adapted for storing therein data on a shape (or shape data) of a three-dimensional model for expressing a shape of an unfinished work W. The data acquisition unit 16 is adapted for bringing the tool 14 into contact with a given portion of the unfinished work W, thereby obtaining data on measurement (or measurement data) indicative of a contact position between the tool 14 and the work. The calculation unit 17 is adapted for calculating data on an actual position (or actual-position data) indicative of a position of a comparative object point, based on the measurement data obtained by the data acquisition unit 16. As used herein, the comparative object point means each site or region, such as a corner portion, which is determined in advance on the work W. The error derivation unit 18 is adapted for obtaining a difference of the data (or data difference) between the actual-position data of the comparative object point calculated by the calculation unit 17 and data on a position of the model (or model-position data) indicative of a position of the comparative object point of the three-dimensional model. The correction unit 19 is adapted for correcting teaching data indicative of a position of the tool corresponding to the shape data of the three-dimensional model, based on the data difference obtained by the error derivation unit 18. For instance, the position of the tool 14 means a distal end position thereof that is to be set upon chamfering the work W. The machining control unit 20 is adapted for performing the finishing process, while controlling the robot 11, based on the corrected teaching data.

Figure 5:
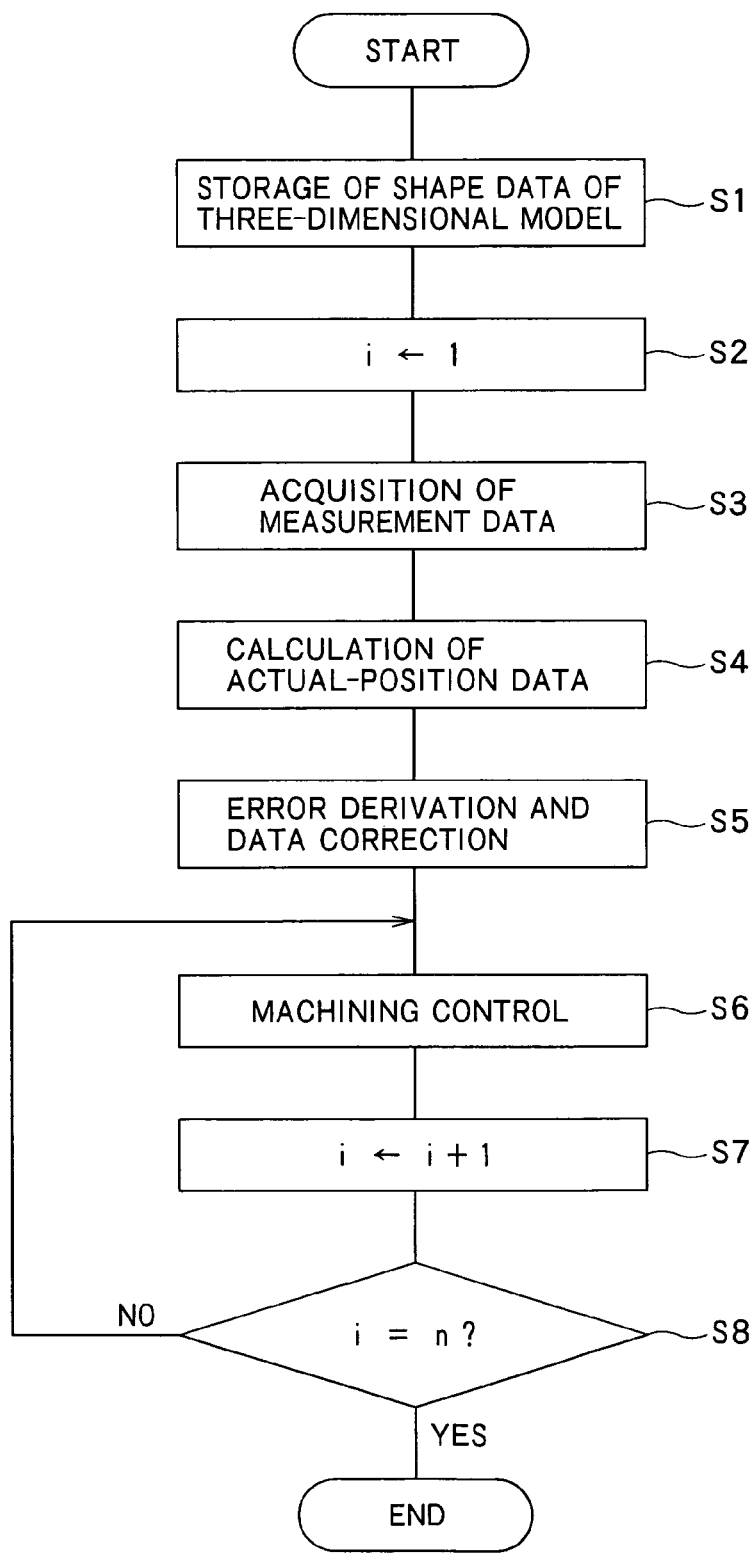
FIG. 5 is a flow chart showing a procedure of controlling the automatic finishing machine.

FIG. 5 is a flow chart showing a procedure for controlling the automatic finishing machine when this finishing machine is used for finishing each attachment groove 1 of the work W. Now, the operation for finishing each attachment groove 1 of the work W by using the automatic finishing machine will be described with reference to FIG. 5.

Prior to the finishing process, the shape data of the three-dimensional model, for expressing the shape of the unfinished work W, is prepared in advance on the PC. More specifically, the shape data of the three-dimensional model is provided on a screen of the PC by a predetermined design specification and/or calculations.

First, upon starting the finishing process by using the automatic finishing machine, the shape data of the three-dimensional model of the unfinished work W is transmitted from the PC and stored in the memory 15 of the controller 12 shown in FIG. 4, in a data storage step (Step S1 shown in FIG. 5).

Then, a program counter incorporated in the controller 12 is set at an initial value (Step S2). Thereafter, in a data acquisition step, the tool 14 is contacted with the given portion of the unfinished work W, so that the measurement data indicative of the contact position can be obtained by the data acquisition unit 16 (Step S3).

As shown in FIG. 4, a tool retainer 11a of the robot 11 for grasping the tool 14 is electrically connected with the work W via a sensor 21. With such electrical connection between the tool 4 and the work W, an electric current can be flowed from the sensor 21 to the work 14 via the tool retainer 11a and then returned to the sensor 21 through the work W, in the above data acquisition step. Namely, with such a returned electric current, the sensor 21 will detect the contact between the tool 14 and the work W. Then, the detection result will be transmitted and stored in the controller 12. Consequently, the measurement data indicative of the contact position (on the rectangular coordinates) of the tool 14, at each point of time for the detection, can be obtained by the data acquisition unit 16. What is important in this embodiment is the fact that the measurement data can be obtained by directly using the machining tool 14. Namely, there is no need for preparing any probe or the like means exclusively used for such measurement. Besides, a need for exchanging such a probe with the tool, or vice versa, during the operation can be eliminated. This can securely enhance efficiency of the finishing process. Furthermore, since an error caused by positional difference between the probe and the machining tool 14 can be eliminated, the finishing process can be performed with higher accuracy.

Figure 6A:
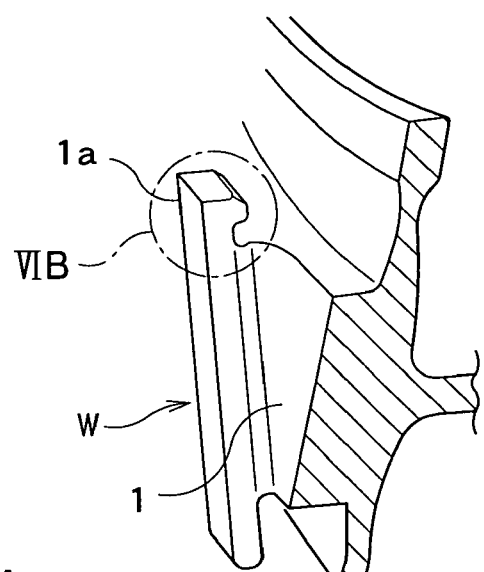
FIG. 6A is a partially cut-away perspective view of the groove of the work shown in FIG. 2A.
Figure 6B:
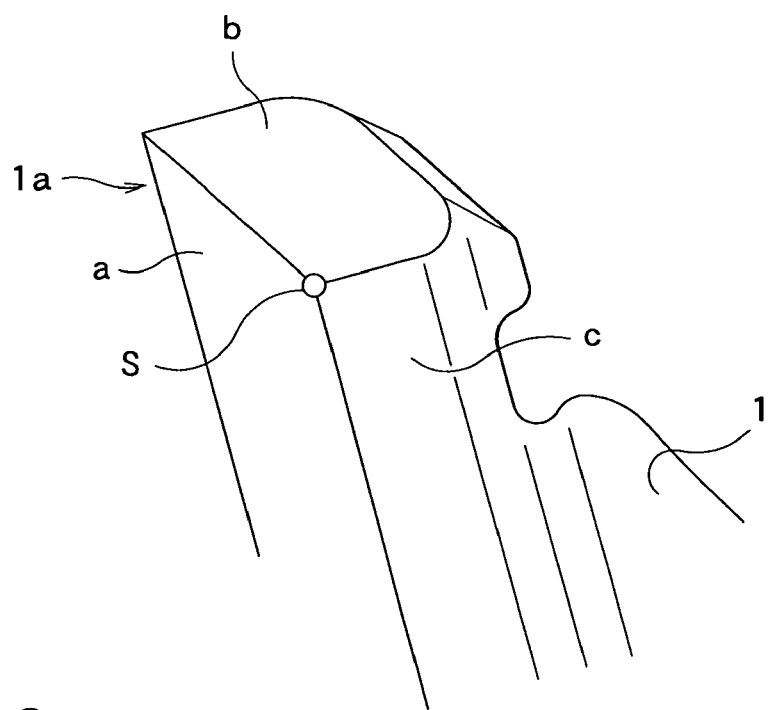
FIG. 6B is an enlarged perspective view of a part VIB of FIG. 6A.

FIG. 6A is a partially cut-away perspective view of one attachment groove 1 of the work W shown in FIG. 2A, and FIG. 6B is an enlarged perspective view of a part VIB of FIG. 6A. As shown in these drawings, each upper edge of the attachment groove 1 of the work W is formed into, for example, a hook-like portion 1a. This hook portion 1a extends inwardly and is shaped to be engaged with the blade 2 (see FIG. 2B) which will be fitted in the groove 1. An outline of each hook portion 1a includes a curved surface a facing outward relative to the work W, a flat surface b facing upward, and another flat surface c facing in the circumferential direction or inward relative to the corresponding groove 1. For instance, in the above data acquisition step, such three crossed faces a, b, c are selected as the given portion of the unfinished work W and will be contacted with the tool 14. In this way, by selecting the three crossed faces a, b, c as the position to be contacted with the tool 14, an intersection point S of the three faces a, b, c can be calculated, accurately, as the comparative object point relative to the three-dimensional model, in a next calculation step S4.

Figure 7A:
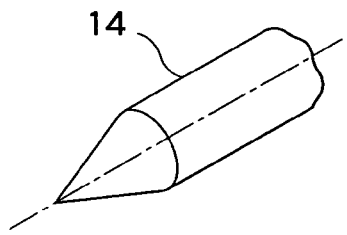
FIG. 7A is a perspective view showing one example of a tool provided to a robot used in the automatic finishing machine.
Figure 7B:
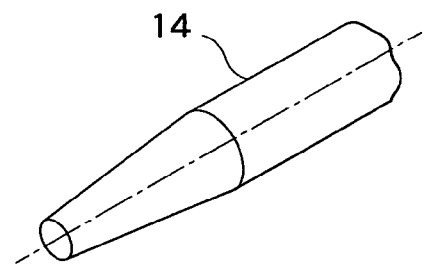
FIG. 7B is a perspective view showing another example of the tool.
Figure 8:
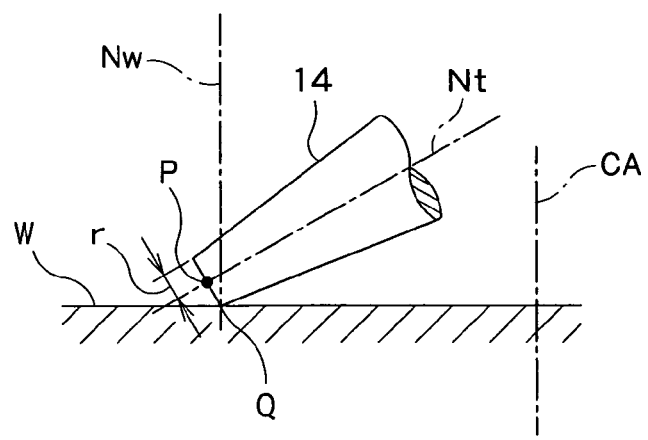
FIG. 8 is a schematic view showing a relationship between a contact point of the tool contacted with a surface of the work and a distal end position of the tool.

In the above data acquisition step, if the distal end of the tool 14 has a conical shape as shown in FIG. 7A, such conical distal end will be directly contacted with the surface of the work W, even though the tool 14 is inclined to the surface of the work W. Thus, a position P of the distal end of the tool 14 can be regarded as a contact point between the tool 14 and the surface of the work W. However, as described above, the tool 14 has usually the distal end having the truncated-cone-like shape as shown in FIG. 7B. In this case, when the tool 14 is contacted with the surface of the work W while being inclined thereto as shown in FIG. 8, the contact point Q between the tool 14 and the surface of the work W will differ from the distal end position P of the tool 14, making it difficult to obtain accurate measurement data. Therefore, the coordinates of such a distal end position P is inputted, in advance, in the data acquisition unit 16.

Thus, in this embodiment, the contact point Q between the tool 14 and the surface of the work W is obtained as described below, based on a posture of the tool 14 and the distal end position P thereof. Then, the resultant contact point Q is used as the measurement data on the contact position between the tool 14 and the given portion of the unfinished work W.

(Definitions)

Figure 9:
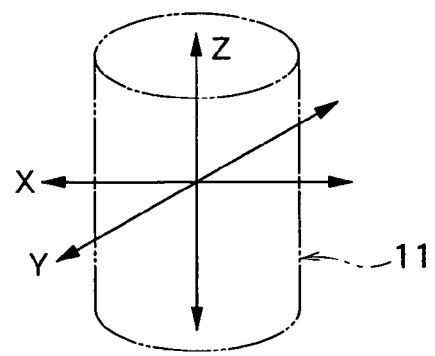
FIG. 9 is a schematic view showing a relationship between the robot of the automatic finishing machine and a rectangular coordinate system.

In a state in which the tool 14 is in contact with the surface of the work W, the distal end position of the tool 14 is designated by $P(X_p, Y_p, Z_p)$, on the rectangular coordinates $(X, Y, Z)$ as shown in FIG. 9, wherein the Z axis is defined as a vertical axis. It is noted that the robot 11 is positioned at the center (or origin) of this coordinate system.

Additionally, a central axis CA of the table 13 (see FIG. 4) is designated by $C(X_c, Y_c)$ in the above coordinate system.

A normal vector extending along a central axis of the tool 14, which is determined by the posture of the robot 11, is expressed by Nt(a, b, c), and another normal vector to the surface of the work W to be measured is designated by Nw(d, e, f).

A radius of a flat face at the distal end of the tool 14 is expressed by r.

It is noted that each value of the above r, P, Nt and Nw is already known.

(Methodology)

First, each contact point Q(Xq, Yq, Zq) between the tool 14 and the work W is obtained, from the distal end point P(Xp, Yp, Zp) of the tool 14, by measuring any given point of (1) the top face b, (2) outer circumferential face a and (3) obtusely angled and inclined face c, respectively shown in FIG. 6B.

Then, the intersection point S(Xs, Ys, Zs) of the three faces a, b, c, is obtained, based on each measured point (1) to (3) of these flat and curved faces.

(Calculation of each contact point Q)

(1) Derivation of the Contact Point Q by Measuring the Top Face b and Inclined Face c Since the contact point Q is on a distal end face of the tool 14 with respect to the normal line Nt as shown in FIG. 8, the following equation can be established.

$$a(Xq-Xp)+b(Yq-Yp)+c(Zq-Zp)=0 \quad (1)$$

Additionally, since the contact point Q is on the circumference of the distal end face of the tool 14, the following equation can be applied.

$$(Xq-Xp)^2+(Yq-Yp)^2+(Zq-Zp)^2=r^2 \quad (2)$$

Furthermore, since the contact point Q is on a plane including the normal line Nw(d, e, f), the following relation can be established.

$$d \cdot Xq + e \cdot Yq + f \cdot Zq - k = 0 \quad (3)$$

In this case, the contact point Q is selected as one that makes k smallest (or largest), among solutions respectively satisfying the above equations (1) through (3).

(2) Derivation of the Contact Point Q by Measuring the Outer Circumferential Face or Cylindrical Face a Again, since the contact point Q is on the distal end face of the tool 14 with respect to the normal line Nt, the following equation can be established.

$$a(Xq-Xp)+b(Yq-Yp)+c(Zq-Zp)=0 \quad (4)$$

Additionally, since the contact point Q is on the circumference of the distal end face of the tool 14, the following equation can be applied.

$$(Xq-Xp)^2+(Yq-Yp)^2+(Zq-Zp)^2=r^2 \quad (5)$$

Furthermore, since the contact point Q is on a cylindrical face of the work W extending around the central axis CA thereof (i.e., the work W has the same central axis as that of the table 13), the following relation can be established.

$$(Xq-Xc)^2+(Yq-Yc)^2=R^2 \quad (6)$$

In this case, the contact point Q is selected one that makes R smallest (or largest), among solutions respectively obtained from the above equations (4) through (6).

In this way, accurate measurement data on each contact point Q of the tool 14 with respect to the surface of the work W can be selectively obtained.

Subsequently, in the calculation step (Step S4), the actual-position data indicative of the position of the comparative object point, i.e., the intersection or corner point S, is calculated by the calculation unit 17 of the controller 12 shown in FIG. 4, based on the measurement data indicative of each contact point of the tool obtained by the above data acquisition step.

Next, an error derivation step and a correction step are performed (Step S5). In the error derivation step, the data difference, between the actual-position data on the comparative object point S calculated by the calculation unit 17 and the data on the position of the model (or model-position data) indicative of the position of the comparative object point S of the three-dimensional model and stored in the memory 15, is obtained by the error derivation unit 18 of the controller 12. Then, in the correction step, the teaching data indicative of the position of the tool corresponding to the shape data of the three-dimensional model is corrected by the correction unit 19 of the controller 12, based on the data difference obtained by the error derivation unit 18. In this way, the teaching data, prepared in advance corresponding to the shape of the unfinished work W, can be corrected, based on the actual-position data on the comparative object point S obtained by bringing the tool 14 into contact with the work W. Thus, any positional deviation, between an ideal environment on an off-line teaching system that has been set upon preparing the three-dimensional model and an actual environment in which the work W is actually placed, can be successfully cancelled.

Thereafter, the finishing process in a range in which the three-dimensional model of the work W is corrected, i.e., the finishing process for the selected one attachment groove 1, is performed, based on the corrected teaching data, while the robot 11 is controlled by the machining control unit 20 of the controller 12 (Step S6).

Subsequently, the program counter incorporated in the controller 12 is incremented (Step S7). At this time, if a count value i is judged not to reach a preset value n (Step S8), the operations of the Steps S6 to S8 will be repeated. For example, the table 13 will be turned, by an angle obtained by dividing 3600 by the total number of the attachment grooves 1, from one finished groove 1 toward a next unfinished one. Then, the finishing process is provided again to the next unfinished groove 1, based on the teaching data that has been corrected through the aforementioned data acquisition step, calculation step, error derivation step and correction step. With repetition of this operation, the finishing process for each attachment groove 1 of the work W will be performed in succession. Thereafter, when the count value i of the program counter reaches the preset value n corresponding to the total number of the attachment grooves 1 (Step S8), the finishing process for all of the attachment grooves 1 of the work W will be regarded to be completed. Then, this finishing process using the automatic finishing machine is ended.

As described above, with the control operation performed by the automatic finishing machine, the finishing process for the work W can be automatically performed, while correcting or cancelling the positional deviation between the ideal environment prepared on the off-line teaching system and the actual environment. Therefore, the time required for teaching the robot 11 on the production site can be significantly reduced, while eliminating the need for special skill or technique for the teaching operation. In addition, this automatic finishing machine can achieve a highly accurate and stable automatic finishing process, thus securely enhancing the accuracy of dimensions of the product. Besides, the aforementioned correction step for correcting the positional deviation can also eliminate a negative effect caused by bending of the robot 11, especially bending of the tool 14. Furthermore, since the measurement data on the work W can be obtained by directly using the machining tool 14, there is no need for preparing any special probe or the like means exclusively used for measuring the data on the work, thereby enhancing the working efficiency. Of course, the elimination of the need for preparing such a probe can also avoid an error caused by a positional difference between the probe and the machining tool 14, thus rendering the finishing process highly accurate.

In the above embodiment, the shape data, on the three-dimensional model for expressing the shape of the unfinished work, has been described as one to be stored in the memory 15 shown in FIG. 4. However, in place of using such data, the teaching data indicative of the position of the tool 14 corresponding to the shape data of the three-dimensional model, e.g., the data indicative of the distal end position of the tool 14 to be set upon chamfering the work, may be stored in the off-line teaching system. Other than the chamfering process as described above, this invention can be applied to any other suitable process, such as a grinding process or the like, for finishing the surface of each attachment groove 1 shown in FIG. 2.

Furthermore, in the above embodiment, the case, in which the present invention is applied to the finishing process for the attachment grooves 1 of the disk-like part (i.e., the work) of the compressor of the jet engine, has been discussed. However, this invention can also be applied to the finishing process for any other various products and/or parts and provide the same effect thereto.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

The invention claimed is:

1. A method of controlling an automatic finishing machine adapted for providing a finishing process to a work by using a robot provided with a tool, comprising:
    a model storage step of storing a shape data of a three-dimensional model for expressing a shape of a work to be unfinished, or storing a teaching data indicative of a position of the tool corresponding to the shape data;
    a data acquisition step of bringing the tool into contact with a given portion of the work so as to obtain a measurement data indicative of a contact position between the tool and the work;
    a calculation on a processor, the step of calculating, based on the measurement data, an actual-position data indicative of a position of a comparative object point;
    an error derivation step of obtaining a data difference between the actual-position data of the comparative object point and a model-position data indicative of a position of the comparative object point in the three-dimensional model;
    a correction step of correcting, based on the data difference, the teaching data indicative of the position of the tool corresponding to the shape data of the three-dimensional model so as to obtain a corrected teaching data; and
    a machining step of performing the finishing process while controlling the robot based on the corrected teaching data,
    wherein the given portion of the work in the data acquisition step includes three faces crossing each other, and
    wherein the calculation step calculates an intersection point of the three faces crossing each other as the actual-position data.

2. The method of controlling the automatic finishing machine according to claim 1, wherein, in the data acquisition step, the measurement data is prepared, based on a posture of the tool and a distal end position of the tool, by obtaining a contact point between the tool and a surface of the work.

3. The method of controlling the automatic finishing machine according to claim 1, wherein, in the data acquisition step, the measurement data is prepared, based on a posture of the tool and a distal end position of the tool, by obtaining a contact point between the tool and a surface of the work.

4. An automatic finishing machine adapted for providing a finishing process to a work by using a robot provided with a tool, comprising:
    a memory configured to store therein a shape data of a three-dimensional model for expressing a shape of a work to be unfinished, or storing therein a teaching data indicative of a position of the tool corresponding to the shape data;
    a data acquisition unit configured to bring the tool into contact with a given portion of the work so as to obtain a measurement data indicative of a contact position between the tool and the work;
    a calculation unit configured to calculate, based on the measurement data, an actual-position data indicative of a position of a comparative object point;
    an error derivation unit configured to obtain a data difference between the actual-position data of the comparative object point and a model-position data indicative of a position of the comparative object point in the three-dimensional model;
    a correction unit configured to correct, based on the data difference, the teaching data indicative of the position of the tool corresponding to the shape data of the three-dimensional model so as to obtain a corrected teaching data; and
    a machining control configured to perform a finishing process while controlling the robot based on the corrected teaching data,
    wherein the given portion of the work in the data acquisition unit includes three faces crossing each other, and
    wherein the calculation unit calculates an intersection point of the three faces crossing each other as the actual-position data.

5. The automatic finishing machine according to claim 4, further comprising: a tool retainer configured to retain the tool; and a sensor electrically connected to both the tool retainer and the work so as to detect an electric current when the tool is brought into contact with the work.

* * * * *